United States Patent [19]

Stucker

[11] Patent Number: 5,108,694
[45] Date of Patent: Apr. 28, 1992

[54] POWER DISTRIBUTION MEASURING SYSTEM EMPLOYING GAMMA DETECTORS OUTSIDE OF NUCLEAR REACTOR VESSEL

[75] Inventor: David L. Stucker, Plum Borough, Pa.
[73] Assignee: Westinghouse Electric Corp., Pittsburgh, Pa.
[21] Appl. No.: 749,380
[22] Filed: Aug. 23, 1991
[51] Int. Cl.$^5$ .............................................. G21C 17/022
[52] U.S. Cl. ................................... 376/245; 376/246; 376/254
[58] Field of Search ............... 376/245, 246, 254, 255, 376/247, 253; 976/215, 216, 224, 225, 226, 227, 238

[56] References Cited

U.S. PATENT DOCUMENTS

| | | | |
|---|---|---|---|
| 2,971,089 | 2/1961 | Haywood | 376/253 |
| 3,161,569 | 12/1964 | Donguy et al. | 376/253 |
| 3,395,074 | 7/1968 | Douet et al. | 376/253 |
| 3,817,829 | 6/1974 | Frisch et al. | 376/253 |
| 3,819,936 | 6/1974 | Weiss et al. | 376/251 |
| 3,845,311 | 10/1974 | Fujii | 376/254 |
| 3,932,211 | 1/1976 | Loving, Jr. | 176/19 R |
| 4,239,595 | 12/1980 | Oates et al. | 176/19 R |
| 4,637,910 | 1/1987 | Impink, Jr. | 376/216 |
| 4,711,753 | 12/1987 | Impink, Jr. et al. | 376/216 |
| 4,839,134 | 6/1989 | Impink, Jr. et al. | 376/216 |
| 4,842,807 | 6/1989 | Fero et al. | 376/254 |
| 4,961,898 | 10/1990 | Bogard et al. | 376/245 |

*Primary Examiner*—Brooks H. Hunt
*Assistant Examiner*—Chrisman D. Carroll

[57] ABSTRACT

A system for measuring the power distribution in a reactor core includes a plurality of gamma detectors disposed outside of the reactor vessel which houses the reactor core. The gamma detectors correspond in number to the number of instrumentation tubes in the fuel assemblies in the reactor core to be sampled. A first plurality of separate flow branches connect the instrumentation tubes with the gamma detectors for routing the flow of coolant from the instrumentation tubes to the gamma detectors so that the gamma detectors can measure the $^{16}$N decay gamma activity in the respective instrumentation tubes of the fuel assemblies. A second plurality of separate flow branches connect a cold leg of the reactor coolant system with the gamma detectors for routing the flow of coolant from the cold leg to the gamma detectors so that the gamma detectors can measure the background gamma activity in the respective instrumentation tubes of the fuel assemblies. Control valves interposed in the first and second pluralities of flow branches are operable to select communication of one or the other of the flows of coolant to the gamma detectors from either the instrumentation tubes or the cold leg.

14 Claims, 5 Drawing Sheets

POWER DISTRIBUTION MEASURING SYSTEM EMPLOYING GAMMA DETECTORS OUTSIDE OF NUCLEAR REACTOR VESSEL

BACKGROUND OF THE INVENTION

1. Field of the Invention

The present invention relates generally to measurement of power distribution within a nuclear reactor core and, more particularly, is concerned with a system for measuring $^{16}N$ decay gamma activity utilizing coolant flow from instrumentation tubes of the fuel assemblies which is routed through gamma detectors located outside of the nuclear reactor vessel.

2. Description of the Prior Art

In a typical pressurized water nuclear reactor (PWR), the reactor core includes a large number of fuel assemblies each of which is composed of top and bottom nozzles with a plurality of elongated transversely spaced guide thimbles extending between the top and bottom nozzles and a plurality of transverse grids axially spaced along the guide thimbles. Each fuel assembly is supported by its bottom nozzle on a lower core plate of the reactor core. Also, each fuel assembly is composed of a plurality of elongated fuel elements or rods transversely spaced apart from one another and from the guide thimbles and supported by the grids between the top and bottom nozzles.

The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Further, in each fuel assembly, provisions are made to enable actual flux distribution measurements to be taken under reactor operating conditions to determine the power distribution of each fuel assembly and thus the overall reactor. For this purpose a hollow instrumentation tube is located in each fuel assembly, extending between the bottom and top nozzles. The instrumentation tube is open at its bottom end and aligned with and seated within a passage extending through the adapter plate of the bottom nozzle.

Elongated flux thimble tubes housing flux detectors are inserted into the reactor core through conduits extending from the bottom of the reactor vessel. Each thimble tube is extended upwardly from the lower core plate to the bottom nozzle of each fuel assembly to where it is inserted into the instrumentation tube through the open bottom end thereof. The thimble tube is adapted to take the flux distribution measurements within the fuel assembly.

During operation, the thimble tubes are stationary. They are retracted from the reactor core only under depressurized conditions during refueling or for maintenance. Primary reactor coolant flows upwardly through the annulus formed between the outside diameter of each flux thimble tube and the inside diameter of the instrumentation tube of each fuel assembly, entering the annulus from the underside of the bottom nozzle.

The environment within the instrumentation tubes within the nuclear reactor core is a severe one. The detectors deployed in the thimble tubes and subjected to this environment are adversely affected such that their useful life is shortened. Consequently, a need exists for an alternative approach to measuring power distribution without placing the detectors within the reactor core environment.

SUMMARY OF THE INVENTION

The present invention provides a power distribution measuring system designed to satisfy the aforementioned needs. The measuring system of the present invention utilizes the flow of the coolant from the instrumentation tubes of fuel assemblies in the reactor core and takes advantage of the presence of activated $^{16}N$ within the coolant which is routed through gamma detectors located outside of the nuclear reactor vessel wherein the gamma decay activity is then measured in a controlled protective environment.

Accordingly, the present invention is set forth in combination with a nuclear reactor vessel, a nuclear reactor core disposed inside of the reactor vessel, a reactor coolant system disposed outside of the reactor vessel, and a primary coolant flow circuit interconnecting the reactor core and the reactor coolant system in flow communication. The primary coolant flow circuit has a hot leg for carrying coolant from the reactor core to the reactor coolant system and a cold leg for carrying coolant from the reactor coolant system to the reactor core. The coolant carried by the cold leg is at a lower temperature than the coolant carried by the hot leg. The reactor core is composed of an array of nuclear fuel assemblies each including nuclear fuel for producing a neutron flux in the fuel assembly and a hollow instrumentation tube extending through the fuel assembly and having a coolant entry end and a coolant exit end. The coolant is capable of flowing through each fuel assembly and the instrumentation tube thereof.

The present invention is directed to a system for measuring power or neutron flux distribution in the reactor core. The measuring system comprises: (a) a plurality of gamma detectors corresponding in number to the number of instrumentation tubes of the fuel assemblies to be sampled, the gamma detectors being disposed outside of the reactor vessel and capable of measuring $^{16}N$ decay gamma activity; (b) a first plurality of separate flow branches, each branch interconnecting in flow communication the exit end of one of the instrumentation tubes with one of the gamma detectors for routing flow of coolant from the instrumentation tubes to the gamma detectors so that the gamma detectors can measure the decay gamma activity in the respective instrumentation tubes of the fuel assemblies; (c) a second plurality of separate flow branches, each branch interconnecting in flow communication the cold leg of the reactor coolant system with each of the gamma detectors for routing flow of coolant from the cold leg to the gamma detectors so that the gamma detectors can measure the background decay gamma activity in the respective instrumentation tubes of the fuel assemblies; (d) means interposed in the first and second pluralities of flow branches and being operable to select communication of one or the other of the flows of coolant to the gamma detectors from either the instrumentation tubes or the cold leg; and (e) means for connecting in flow communication each of the gamma detectors with the cold leg of the primary coolant flow circuit for routing flow of coolant from the gamma detectors back to the cold leg of the primary coolant flow circuit.

Also, the measuring system includes a plurality of coolant flow meters corresponding in number to the number of gamma detectors and being disposed outside of the reactor vessel. Each of the flow meters is connected in flow communication with one of the gamma detectors. Further, the system includes means, such as a heat exchanger, interposed in the cold leg of the reactor coolant system and the separate flow branches of the first plurality thereof for transferring heat from the coolant flowing in the first plurality of separate flow branches to the cold leg and thereby reducing the temperature of the coolant reaching the gamma detectors. Also, the system includes means for enclosing the plurality of gamma detectors so as to provide a shielded environment for the detectors to prevent cross-talk between them.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
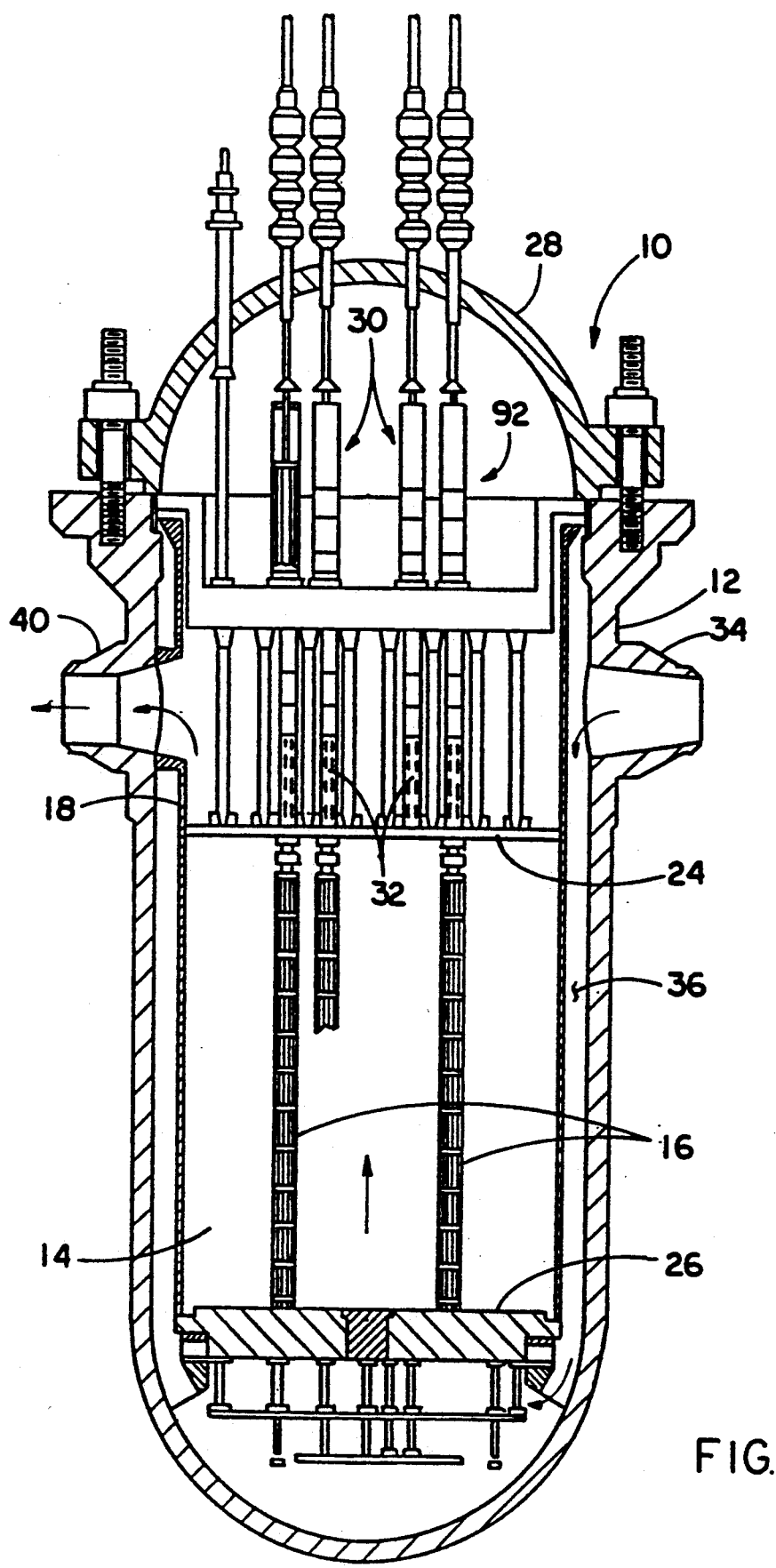
FIG. 1 is a longitudinal elevational view, partly in section, of a nuclear reactor to which the power distribution measuring system of the present invention is applied.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown a pressurized water nuclear reactor (PWR), being generally designated by the numeral 10. The PWR 10 includes a reactor pressure vessel 12 which houses a nuclear reactor core 14 composed of a plurality of elongated fuel assemblies 16. The relatively few fuel assemblies 16 shown in FIG. 1 is for purposes of simplicity only. In reality, the core 14 is composed of a great number of fuel assemblies 16. Spaced radially inwardly from the reactor vessel 12 is a generally cylindrical core barrel 18 which surrounds the fuel assemblies 16 of the reactor core 14. The reactor core 14 is disposed between upper and lower core plates 24, 26 which, in turn, are supported by the core barrel 18.

The upper end of the reactor pressure vessel 12 is hermetically sealed by a removable closure head 28 upon which are mounted a plurality of control rod drive mechanisms 30. Again, for simplicity, only a few of the many control rod drive mechanisms 30 are shown. Each drive mechanism 30 selectively positions a rod cluster control mechanism 32 above and within some of the fuel assemblies 16.

A nuclear fission process carried out in the fuel assemblies 16 of the reactor core 14 produces heat which is removed during operation of the PWR 10 by circulating a coolant fluid, such as light water with soluble boron, through the core 14. More specifically, the coolant fluid is typically pumped into the reactor pressure vessel 12 through a plurality of inlet nozzles 34 (only one of which is shown in FIG. 1). The coolant fluid passes downward through an annular region 36 defined between the reactor vessel 12 and core barrel 18 until it reaches the bottom of the reactor vessel 12 where it turns 180 degrees prior to flowing up through the lower core plate 26 and then up through the reactor core 14.

On flowing upwardly through the fuel assemblies 16 of the reactor core 14, the coolant fluid is heated to reactor operating temperatures by the transfer of heat energy from the fuel assemblies 16 to the fluid. The hot coolant fluid then exits the reactor vessel 12 through a plurality of outlet nozzles 40 (only one being shown in FIG. 1) extending through the core barrel 18. Thus, heat energy which the fuel assemblies 16 impart to the coolant fluid is carried off by the fluid from the pressure vessel 12 to steam generators (not shown) where most of the heat energy is removed before return of the coolant fluid back to the reactor vessel 12.

Figure 2:
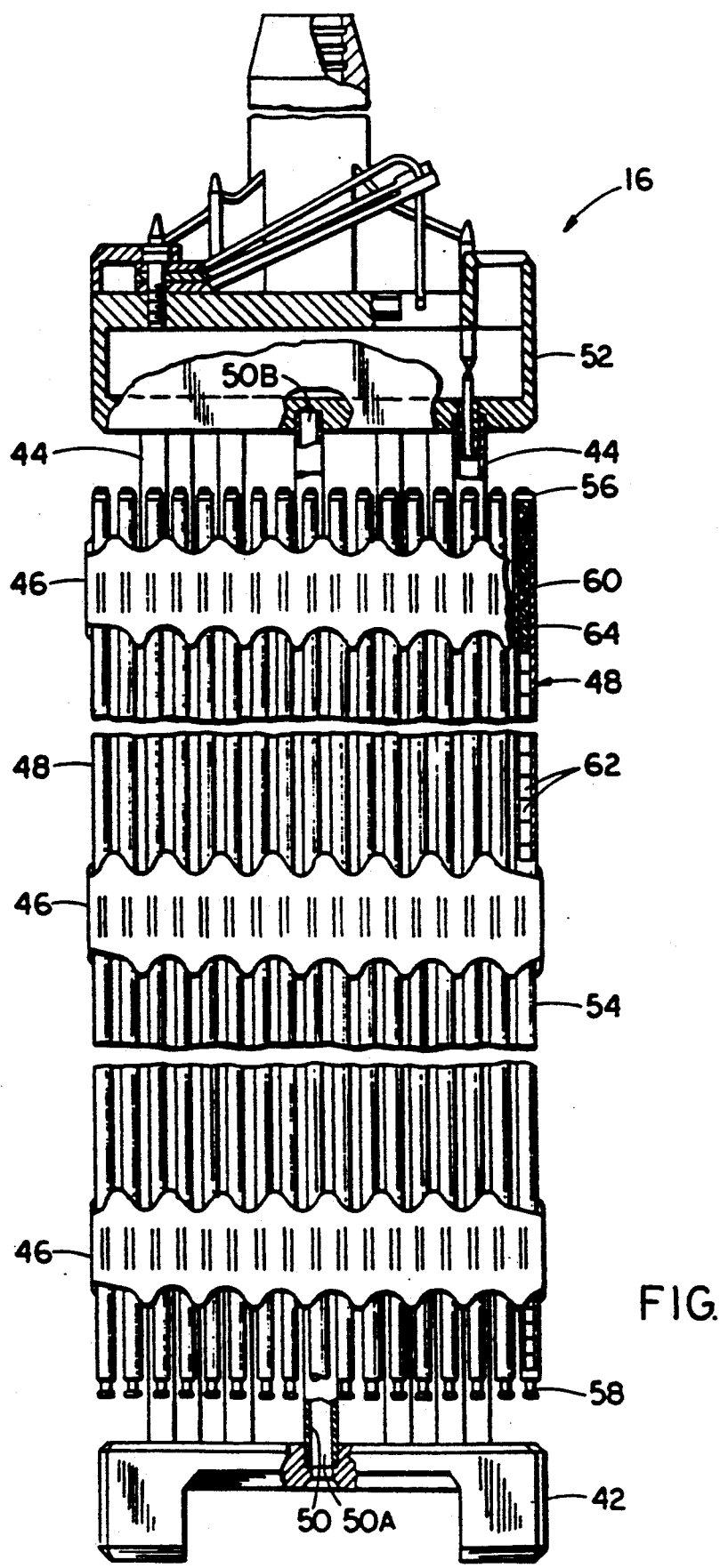
FIG. 2 is an elevational, vertically foreshortened view, with parts sectioned and parts broken away, of one nuclear fuel assembly in the reactor of FIG. 1, to which the power distribution measuring system of the present invention is applied.

As briefly mentioned above, the reactor core 14 is composed of a large number of elongated fuel assemblies 16. Turning to FIG. 2, each fuel assembly 16, being of the type used in the PWR 10, basically includes a lower end structure or bottom nozzle 42 which supports the assembly on the lower core plate 26 and a number of longitudinally extending guide tubes or thimbles 44 which project upwardly from the bottom nozzle 42. The assembly 16 further includes a plurality of transverse support grids 46 axially spaced along the lengths of the guide thimbles 44 and attached thereto. The grids 46 transversely space and support a plurality of fuel rods 48 in an organized array thereof. Also, the assembly 16 has an instrumentation tube 50 located in the center thereof and an upper end structure or top nozzle 52 attached to the upper ends of the guide thimbles 44. With such an arrangement of parts, the fuel assembly 16 forms an integral unit capable of being conveniently handled without damaging the assembly parts.

Each of the fuel rods 48 of the fuel assembly 16 has an identical construction insofar as each includes an elongated hollow cladding tube 54 with a top end plug 56 and a bottom end plug 58 attached to and sealing opposite ends of the tube 54 defining a sealed chamber 60 therein. A plurality of nuclear fuel pellets 62 are placed in an end-to-end abutting arrangement or stack within the chamber 60 and biased against the bottom end plug 58 by the action of a spring 64 placed in the chamber 60 between the top of the pellet stack and the top end plug 56. The nuclear fuel pellets 62 of each fuel assembly 16 produces a neutron field in the fuel assembly. The hollow instrumentation tube 50 extending through the fuel assembly 16 between the fuel rods 48 has a lower end 50A through which coolant enters and an upper end 50B through which coolant exits the instrumentation tube 50.

Power Distribution Measuring System of the Invention

Figure 3:
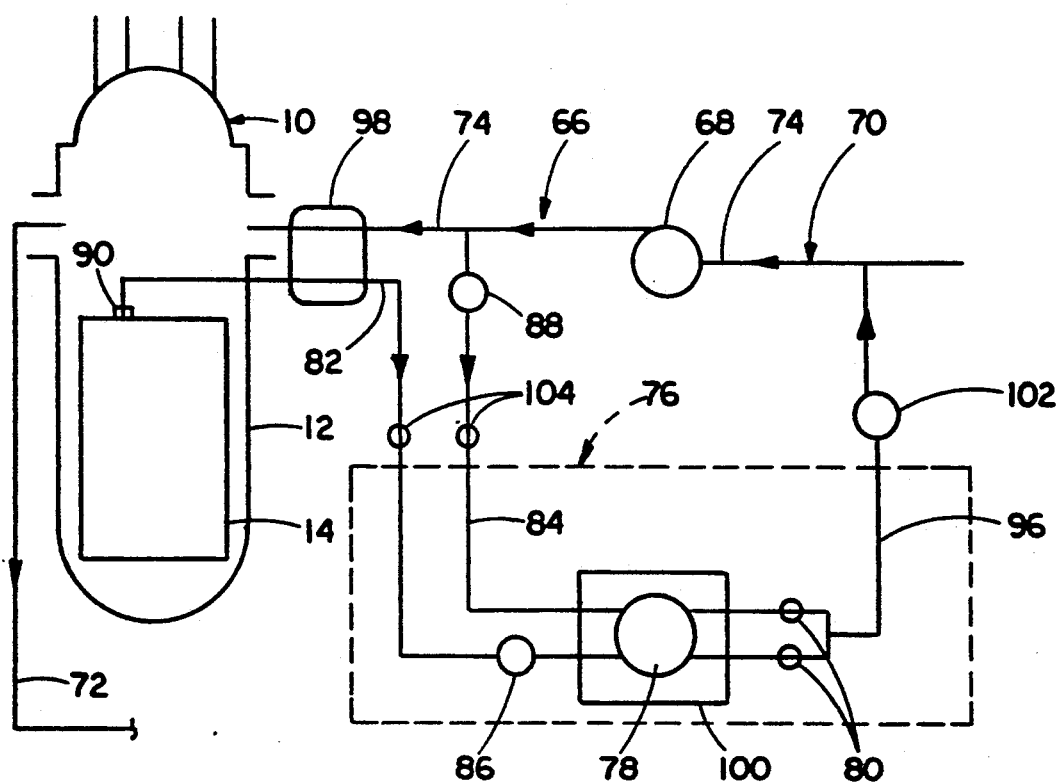
FIG. 3 is a diagrammatic view of the power distribution measuring system of the present invention coupled with the nuclear reactor and the reactor coolant system.

Referring to FIG. 3, there is shown a part of a reactor coolant recirculation system 66, in the form of a reactor coolant pump 68, being disposed outside of the reactor vessel 12, and a primary coolant flow circuit 70. The reactor coolant pump 68 is connected in flow communication with the nuclear reactor core 14 by hot and cold legs 72, 74 of the primary coolant flow circuit 70 which extend through the nuclear reactor vessel 12. The hot leg 72 of the circuit 70 carries coolant from the reactor core 14 to the reactor coolant system 66, while the cold leg 74 of the circuit 70 carries coolant from the reactor coolant system 66 back to the reactor core 14. The coolant carried by the cold leg 74 is at a substantially lower temperature than the coolant carried by the hot leg 72.

Referring now to FIGS. 3-8, there is illustrated, in diagrammatic form, a power distribution measuring system, generally designated 76, which functions in accordance with the principles of the present invention. Basically, the overall function of the power distribution system 76 of the present is as follows: Due to the fission process caused by the nuclear fuel pellets 62, the oxygen in the light water coolant absorbs high energy neutrons resulting in high energy Nitrogen, i.e., $^{16}N$. The $^{16}N$, being radioactive, decays as it is piped out of the reactor vessel 12 with the coolant and thus emits gamma rays which are then detected and measured.

Figure 4:
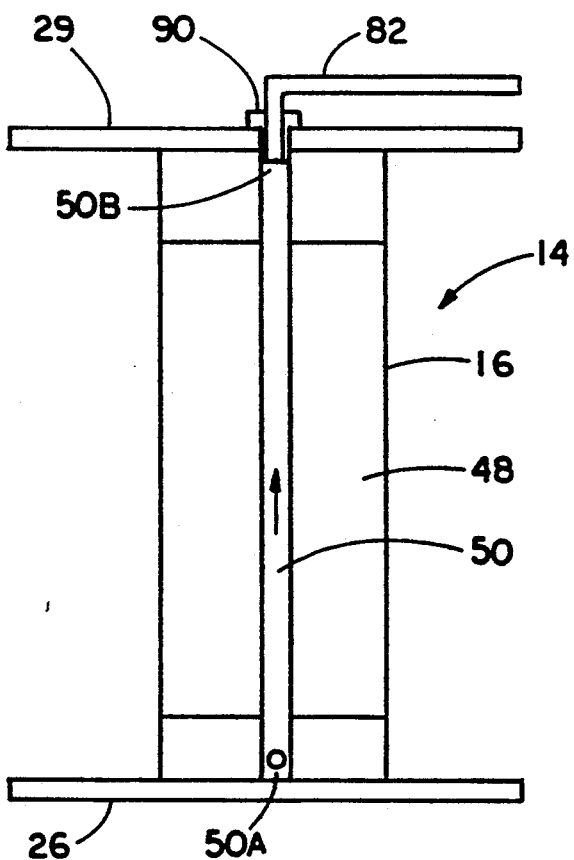
FIG. 4 is a diagrammatic view of one of the fuel assemblies of the nuclear reactor showing the flow path of the sampled coolant through the one fuel assembly.
Figure 5:
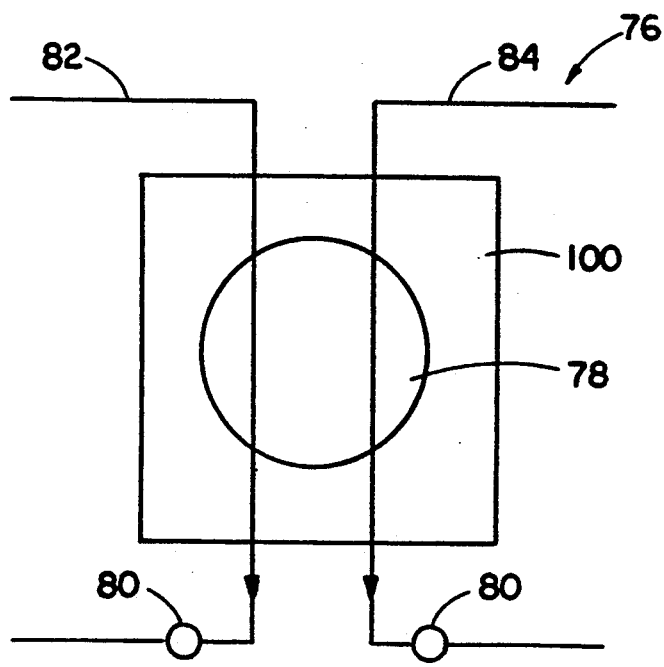
FIG. 5 is a diagrammatic view of the flows of sampled coolant from one fuel assembly and of reference coolant from the cold leg of the coolant system through one of the gamma detectors of the measuring system of the present invention.
Figure 6:
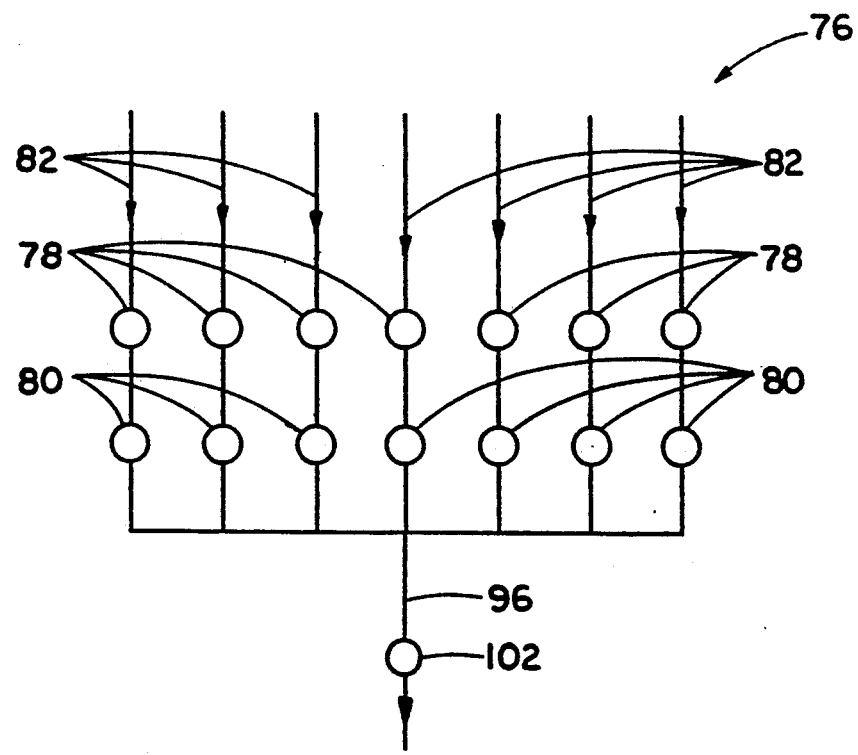
FIG. 6 is a diagrammatic view of flows of sampled coolant from a plurality of fuel assemblies through a plurality of gamma detectors of the measuring system of the present invention.
Figure 7:
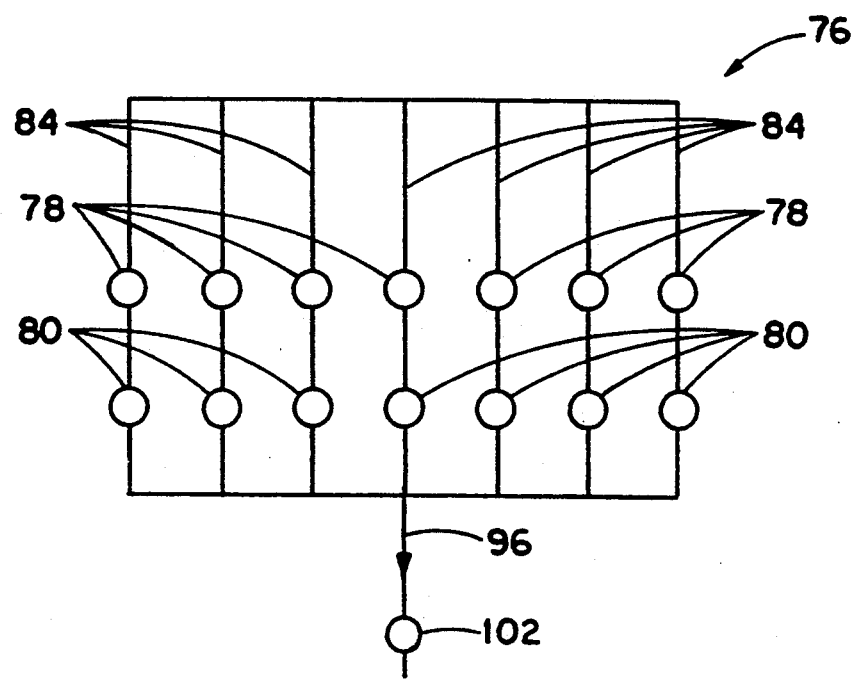
FIG. 7 is a diagrammatic view of flows of reference coolant from the cold leg of the coolant system through the plurality of gamma detectors of the measuring system of the present invention.

As diagrammatically represented in FIG. 4, in each fuel assembly 16 a small portion of primary reactor coolant is drawn into the lower end 50A of the instrumentation tube 50 at background level $^{16}N$ before being irradiated by the fuel of the assembly 16. The coolant travels upwardly through the closed channel of the tube 50, thereby passing through the individual fuel assembly 16 where it is irradiated by the fuel of the assembly. After passing through the fuel of the assembly 16, the coolant, now containing a substantially increased level of $^{16}N$, exits through the upper end 50B of the tube 50 and is routed by the components of the measuring system 76 outside of the reactor vessel 12 where the level of $^{16}N$ (decay gamma activity) will be measured before the coolant is returned to the reactor core 14 by the primary coolant flow circuit 70. A measurement of the coolant flow rate is also made by the system 76 to determine the amount of $^{16}N$ decay which has occurred. Further, a measurement of the background level of $^{16}N$ in, and flow rate of, reference coolant from the cold leg 74 is made by the system 76 in order to zero out its effect on the measurement made on the coolant from the instrumentation tube 50.

Basically, the power distribution measuring system 76 includes a plurality of gamma detectors 78, a plurality of flow meters 80, a first plurality of separate flow branches 82, a second plurality of separate flow branches 84, and control valves 86, 88 interposed in the respective first and second pluralities of branches 82, 84.

The gamma detectors 78 are disposed outside of the reactor vessel 12 where the environment can be controlled and is much less severe than inside of the instrumentation tubes 50. The number of gamma detectors 78 of the measuring system 76 corresponds to, or is the same as, the number of instrumentation tubes 50 of the fuel assemblies 16 composing the reactor core 14 to be sampled by the measuring system 76. The gamma detectors 78 which are capable of measuring $^{16}N$ decay gamma activity, are conventional off-the-shelf components.

Referring particularly to FIGS. 1-3 and 8, each first flow branch 82 interconnects in flow communication the exit end 50B of one of the instrumentation tubes 50 with one of the gamma detectors 78. At the location of each fuel assembly 16, a flow connector 90 is attached to the lower adapter plate 52A of the top nozzle 52 to provide flow communication between the exit end 50B of the instrumentation tube 50 of the fuel assembly 16 and the one first flow branch 82. The first flow branch 82 runs above the upper core plate 24 through the upper internals 92 and therefrom out through a penetration 94 in the reactor vessel 12. The first flow branches 82 route flows of coolant from the instrumentation tubes to the gamma detectors 78 so that the induced $^{16}N$ gamma flux can be measured by the individual gamma detectors in the respective instrumentation tubes 50 of the fuel assemblies 16.

In order for the measurements of decay gamma activity in the coolant flows from the instrumentation tubes 50 to have meaning, the background gamma activity existing in the coolant must be known and compensated for in the measurements. The second flow branches 84 are provided for achieving this result. Each second flow branch 84 interconnects in flow communication the cold leg 74 of the reactor coolant system 66 with one of the gamma detectors 78. Thus, flows of coolant from the cold leg 74 can be routed to the gamma detectors 78 so that the gamma detectors can measure the residual or background $^{16}N$ gamma activity in the coolant flows through the fuel assemblies 16 and thus through the respective instrumentation tubes 50 thereof. The coolant from the cold leg 74 provides a reference measurement which can be subtracted from, or zeroed out of, the measurements made of the coolant flow directly from the instrumentation tubes 50 via the first flow branches 82. For alternating between routing the instrumentation tube coolant flows and the cold leg coolant flows to the gamma detectors 78, the control valves 86 and 88 interposed in the respective first and second pluralities of flow branches 82, 84 are operated to select the desired one of the flows to route to the gamma detectors 78. The control valve 88 interposed between the gamma detectors 78 and the cold leg 74 can be a single valve since the same coolant flow can be routed from the cold leg 74 to all of the separate second flow branches 84. However, the control valve 86 interposed between the gamma detectors 78 and the instrumentation tubes 50 must be a bank of multiple valves, one for each of the separate first flow branches 82.

The coolant flow meters 80 are located downstream of the gamma detectors 78. The number of coolant flow meters 80 correspond to the number of gamma detectors 78 and likewise are disposed outside of the reactor vessel 12. Each flow meter 80 is connected in flow communication with one of the gamma detectors 78. Once the respective coolant flows exit the flow meters 80, they can be merged together and routed along a single flow branch 96 back to the cold leg 74 of the primary coolant flow circuit 70. The flow meters 80 which are capable of measuring the rate of coolant flow, are conventional off-the-shelf components.

The power (neutron flux distribution) measuring system 76 also includes means in the form of a heat exchanger 98 interposed across the cold leg 74 of the primary coolant flow circuit 70 and across the separate first flow branches 82. The heat exchanger 98 functions to allow transfer of heat to the coolant flowing in the cold leg 74 from the coolant flowing in the separate first flow branches 82 in order to substantially reduce the temperature of the coolant routed from the instrumentation tubes 50 to the gamma detectors 78. Also, means in the form of a lead shield 100 is provided for enclosing the gamma detectors 78 so as to provide protective, shielded environment to prevent cross-talk between the detectors.

Additionally, a booster pump 102 is interposed in the single return flow branch 96 after the flow meters 80 so that the coolant is returned to the flow circuit 70 at the same pressure as the primary coolant flow. Further, solenoid valves 104 are interposed in the first flow branches 82. The solenoid valves 104 can be operated so as to select either continuous or pulse modes of operation of coolant flow through the gamma detectors 78.

The measuring system 76 just described offers the advantage of providing near real-time local fission rate readings for selected fuel assemblies 16 (those without control rods in them) and thus provides a real-time radial fission rate distribution for the reactor core 14. Radial power distribution measurements are available in essentially real-time in the continuous measurement mode, whereas axial power distribution measurements are available by operation in the pulse mode.

Figure 8:
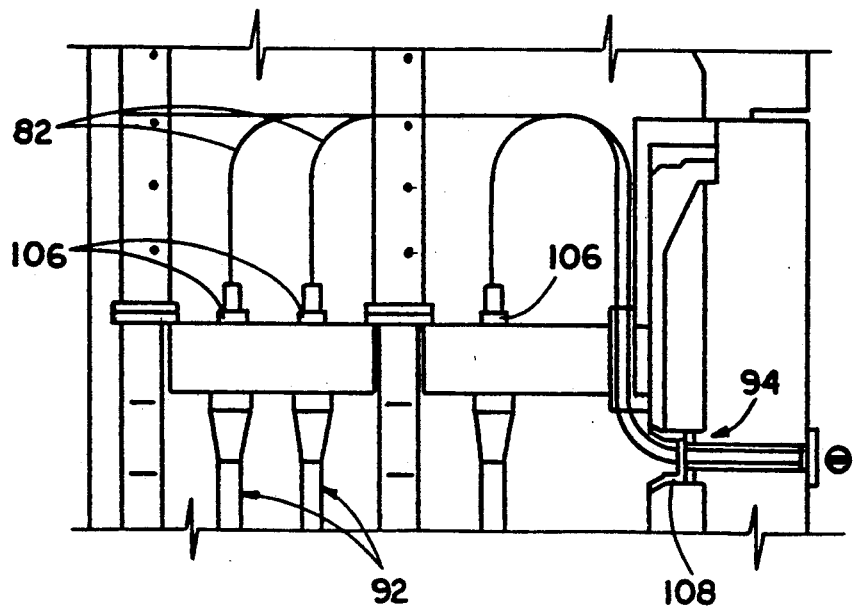
FIG. 8 is a fragmentary schematic view of an exemplary arrangement of paths of the measuring system for routing sampled coolant from individual instrumentation tubes of the fuel assemblies to the heat exchanger of the system located outside of the reactor core.

Also, the measuring system 76 offers the additional advantage of simplifying the refueling procedure. Referring to FIG. 8, a ball and cone connection 106 can be provided in each of the first flow branches 82 with the upper core plate 24. Then, during refueling, all that is necessary is to break the connection 108 located at the penetration 94 of the wall of the pressure vessel 12, disconnect the connection 106 at the upper core plate 24, and then remove the upper core plate.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In combination with a nuclear reactor vessel, a nuclear reactor core disposed inside of said vessel, a reactor coolant system disposed outside of said vessel, and a primary coolant flow circuit connecting said reactor core and said reactor coolant system in flow communication, said primary coolant flow circuit having a hot leg for carrying coolant from said reactor core to said reactor coolant system and a cold leg for carrying coolant from said reactor coolant system to said reactor core, the coolant carried by said cold leg being at a lower temperature than the coolant carried by said hot leg, said reactor core being composed of an array of nuclear fuel assemblies each including nuclear fuel for producing a neutron flux in said fuel assembly and a hollow instrumentation tube extending through said fuel assembly and having a coolant entry end and a coolant exit end, the coolant being capable of flowing through each fuel assembly and said instrumentation tube thereof, a system for measuring the power distribution in said reactor core, said system comprising:

(a) a plurality of gamma detectors corresponding in number to the number of instrumentation tubes of said fuel assemblies to be sampled, said gamma detectors being disposed outside of said reactor vessel and capable of measuring $^{16}N$ decay gamma activity;

(b) a first plurality of separate flow branches, each branch interconnecting in flow communication the exit end of one of said instrumentation tubes with one of said gamma detectors for routing flow of coolant from said instrumentation tubes to said gamma detectors so that said gamma detectors can measure the $^{16}N$ decay gamma activity in the respective instrumentation tubes of said fuel assemblies;

(c) a second plurality of separate flow branches, each branch interconnecting in flow communication said cold leg of said reactor coolant system with each of said gamma detectors for routing flow of coolant from said cold leg to said gamma detectors so that said gamma detectors can measure the background gamma activity in the respective instrumentation tubes of said fuel assemblies;

(d) control means interposed in said first and second pluralities of flow branches and being operable to select communication of one or the other of the flows of coolant to said gamma detectors from either said instrumentation tubes or said cold leg; and (e) means for connecting in flow communication each of said gamma detectors with the cold leg of said primary coolant flow circuit for routing flow of coolant from said gamma detectors back to said cold leg of said primary coolant flow circuit.

2. The measuring system as recited in claim 1, further comprising:
means for enclosing said gamma detectors so as to provide a shielded environment for said gamma detectors to prevent cross-talk between them.

3. The measuring system as recited in claim 1, further comprising:
means interposed in said cold leg of said reactor coolant system and said first separate flow branches for transferring heat from coolant flowing in said first separate flow branches to said cold leg and thereby reducing the temperature of the coolant reaching said gamma detectors.

4. The measuring system as recited in claim 3, wherein said transferring means is a heat exchanger.

5. The measuring system as recited in claim 1, wherein said control means is a pair of control valves interposed respectively in said first and second pluralities of said flow branches.

6. The measuring system as recited in claim further comprising:
   means for selecting between continuous and pulse modes of operation of said gamma detectors.

7. The measuring system as recited in claim 3, further comprising:
   means for enclosing said gamma detectors so as to provide a shielded environment for said gamma detectors to prevent cross-talk between them.

8. In combination with a nuclear reactor vessel, a nuclear reactor core disposed inside of said vessel, a reactor coolant system disposed outside of said vessel, and a primary coolant flow circuit connecting said reactor core and said reactor coolant system in flow communication, said primary coolant flow circuit having a hot leg for carrying coolant from said reactor core to said reactor coolant system and a cold leg for carrying coolant from said reactor coolant system to said reactor core, the coolant carried by said cold leg being at a lower temperature than the coolant carried by said hot leg, said reactor core being composed of an array of nuclear fuel assemblies each including nuclear fuel for producing a neutron flux in said fuel assembly and a hollow instrumentation tube extending through said fuel assembly and having a coolant entry end and a coolant exit end, the coolant being capable of flowing through each fuel assembly and said instrumentation tube thereof, a system for measuring neutron flux distribution in said reactor core, said system comprising:
   (a) a plurality of gamma detectors corresponding in number to the number of instrumentation tubes of said fuel assemblies to be sampled, said gamma detectors being disposed outside of said reactor vessel and capable of measuring $^{16}N$ decay gamma activity;
   (b) a first plurality of separate flow branches, each branch interconnecting in flow communication said exit end of one of said instrumentation tubes with one of said gamma detectors for routing flow of coolant from said instrumentation tubes to said gamma detectors so that said gamma detectors can measure the $^{16}N$ decay gamma activity in the respective instrumentation tubes of said fuel assemblies;
   (c) a second plurality of separate flow branches each interconnecting in flow communication said cold leg of said reactor coolant system with each of said gamma detectors for routing flow of coolant from said cold leg to said gamma detectors so that said gamma detectors can measure the background gamma activity in the respective instrumentation tubes of said fuel assemblies;
   (d) means interposed in the first and second pluralities of flow branches and being operable to select communication of one or the other of the flows of coolant to said gamma detectors from either said instrumentation tubes or said cold leg;
   (e) a plurality of coolant flow meters corresponding in number to the number of gamma detectors and being disposed outside of said reactor vessel, each of said flow meters being connected in flow communication with one of said gamma detectors; and
   (f) means for connecting in flow communication each of said flow meters with said cold leg of said primary coolant flow circuit for routing flow of coolant from said flow meters back to said cold leg of said primary coolant flow circuit.

9. The measuring system as recited in claim 8, further comprising:
   means for enclosing said plurality of gamma detectors so as to provide shielded environment for said gamma detectors to prevent cross-talk between them.

10. The measuring system as recited in claim 8, further comprising:
   means interposed in said cold leg of said reactor coolant system and said first separate flow branches for transferring heat from coolant flowing in said first separate flow branches to said cold leg and thereby reducing the temperature of the coolant reaching said gamma detectors.

11. The measuring system as recited in claim 10, wherein said transferring means is a heat exchanger.

12. The measuring system as recited in claim 10, further comprising:
   means for enclosing said plurality of gamma detectors so as to provide a shielded environment for said gamma detectors to prevent cross-talk between them.

13. The measuring system as recited in claim 8, wherein said control means is a pair of control valves interposed respectively in said first and second pluralities of flow branches.

14. The measuring system as recited in claim 8, further comprising:
   means for selecting between continuous and pulse modes of operation of said gamma detectors.

* * * * *